Feb. 3, 1931. C. E. BAILEY 1,790,786
BELT GEARING
Filed Sept. 1, 1928   2 Sheets-Sheet 1

Inventor
Charles E. Bailey
By Henry Orth
Attorney

Feb. 3, 1931.  C. E. BAILEY  1,790,786
BELT GEARING
Filed Sept. 1, 1928   2 Sheets-Sheet 2

Inventor
Charles E. Bailey
By Henry Orth Jr
Attorney

Patented Feb. 3, 1931

1,790,786

UNITED STATES PATENT OFFICE

CHARLES E. BAILEY, OF CHAMBERSBURG, PENNSYLVANIA, ASSIGNOR TO T. B. WOOD'S SONS COMPANY, OF CHAMBERSBURG, PENNSYLVANIA, A CORPORATION OF PENNSYLVANIA

BELT GEARING

Application filed September 1, 1928. Serial No. 303,547.

My invention relates to belt gearing, and comprises a single driving wheel connected by a belt to a driven wheel on a shaft with a contactor pulley between the wheels, in combination with a second driven wheel reversely operated by a belt from the contactor wheel, and a second contactor wheel for the second belt.

Heretofore the reverse drive has been effected by a second engine belt pulley, usually at the side of the direct driving pulley and a crossed belt on the second pulley.

This required either an additional pedestal bearing for the driving shaft, or else subjected the engine shaft to too great bending strain; it also required an extra long shaft, not supplied with the engine, or electric motor, which shaft had to be specially supplied. The crossed belt also was subjected to too much wear.

My invention enables the use of any prime mover, as engine or electric motor, having but a single driving pulley and belt, and the use of a shorter and less expensive driving belt, that is not crossed, thus economizing in cost of belting and prolonging the life of the reversing belt.

Referring to the drawings, in which like parts are similarly designated—

Figure 1:
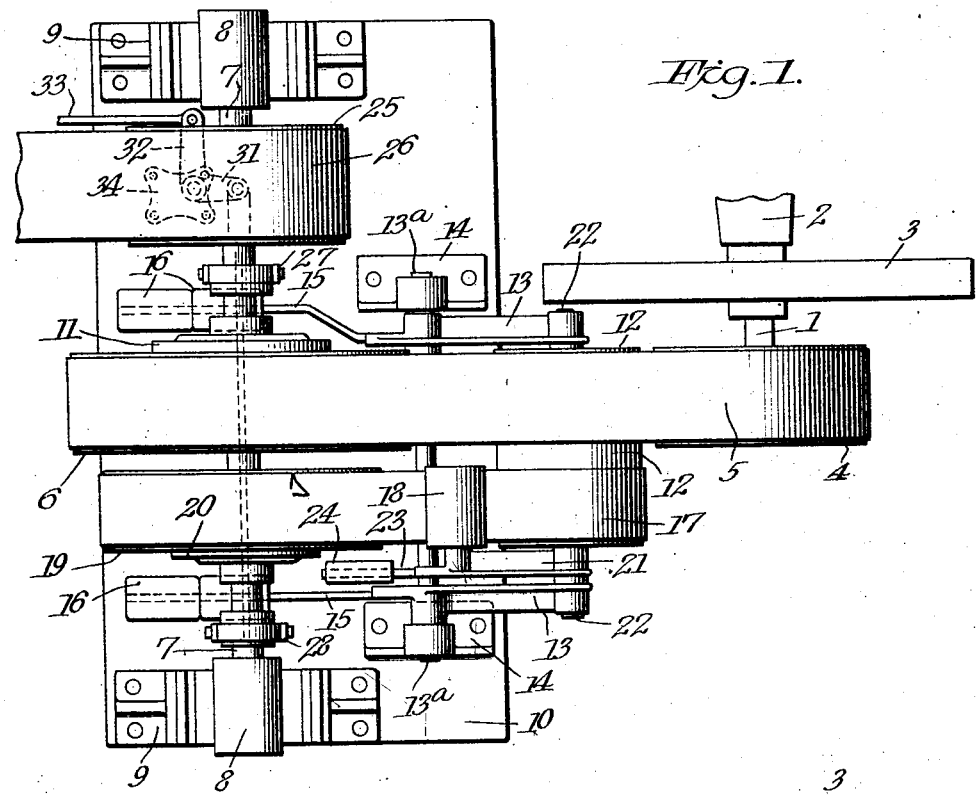
Figure 1 is a plan view.
Figure 2:
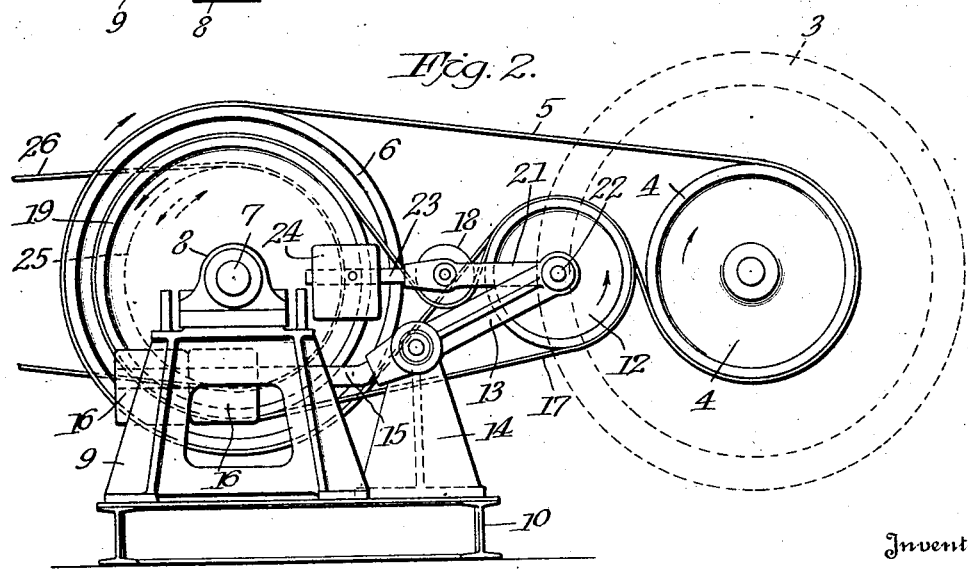
Fig. 2 is an elevation of my belt-drive or gearing.
Figure 3:
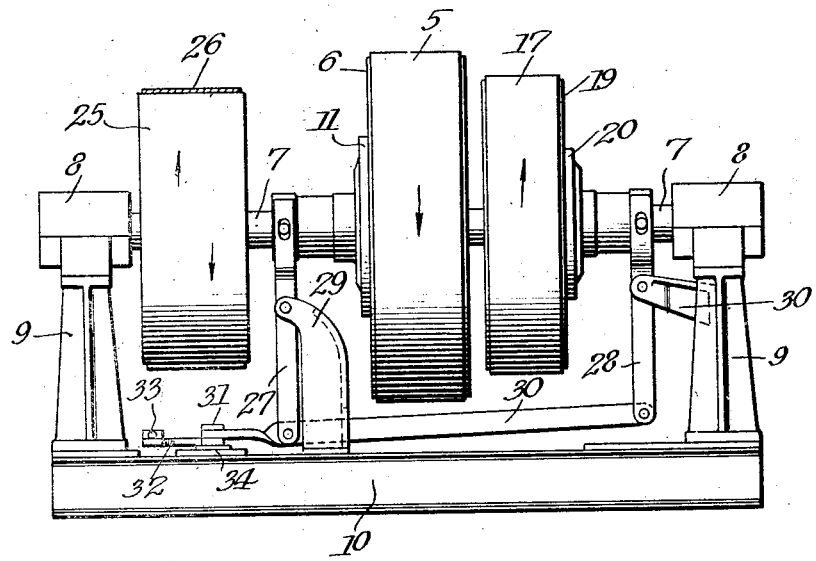
Fig. 3 is an end view.

Referring to Figs. 1–3, the shaft 1 of any type of prime mover 2 is provided with a flywheel 3 and a driven pulley 4.

The pulley 4 is connected by a belt 5 to a pulley 6 loose on a counter-shaft 7 mounted in bearings 8 on pedestals 9 on a suitable base 10. The pulley 6 is connected to the counter-shaft 7 by a clutch 11. The belt 5 passes over a wide faced contactor pulley 12 that is mounted between two arms 13 rigidly mounted on a main spindle 13ª rotatable in pedestals 14 on the base 10. The arms have extensions 15 reaching below the counter-shaft 7 and are provided with adjustable weights 16 that lift the contactor pulley 12 against the under side of the lower slack reach of the belt 5.

On that portion of the contactor pulley 12 projecting to the side of the belt 5 I place an open belt 17 whose upper slack reach is provided with an auxiliary contactor pulley 18. The belt passes around a second pulley 19 loose on the counter shaft 7 and is connected thereto by a clutch 20.

The auxiliary contactor pulley 18 is mounted in an arm 21 pivoted on the shaft 22 of the main contactor pulley 12, and has an extension 23 provided with an adjustable weight 24. The counter shaft has secured to it a pulley 25 carrying a belt 26 to the pulley of the machine to be driven.

The clutches are shifted by levers 27 and 28, Fig. 3, pivoted respectively to a standard 29 and to a bracket 30 extending from one of the pedestals 9. The lower ends of the shift levers 27 and 28 are pivotally connected to a bar 30, one end of which is connected to an arm 31 of a bell-crank lever, the other arm 22 of which is connected to a pull rod 33 operated by a lever engaging a sector (not shown) in the customary way, or in any other suitable manner.

The bell-crank lever is mounted on a pivot member 34 secured to the base 10.

In operation the main contactor pulley 12 that engages and tightens the open main forward driving belt 5 has a direction of movement opposite to that of the engine or motor pulley 4, so that the open belt 17 is reversely driven to reverse the direction of the counter shaft 7.

The axle of the contactor pulley 18 of the reversing belt 17 acts as a pivot for arms 23 whose end loaded by weight 24 urges the opposite end of the arm on the main contactor pulley 12 upward, so that in this way the load on the main contactor pulley is dependent on the position of the weight 24, while the auxiliary contactor pulley 18 is free to accommodate itself to the slack of belt 17. However, the adjustable weights 16 on arm 15 permit the main contactor pulley to be variably loaded independently of the auxiliary contactor 18, and without affecting the load on the auxiliary contactor pulley.

The arrangement of the clutches 11 and 20 is as usual, and they are so connected that when one clutch is on the other is off, and in the intermediate stage, both are off.

Figure 4:
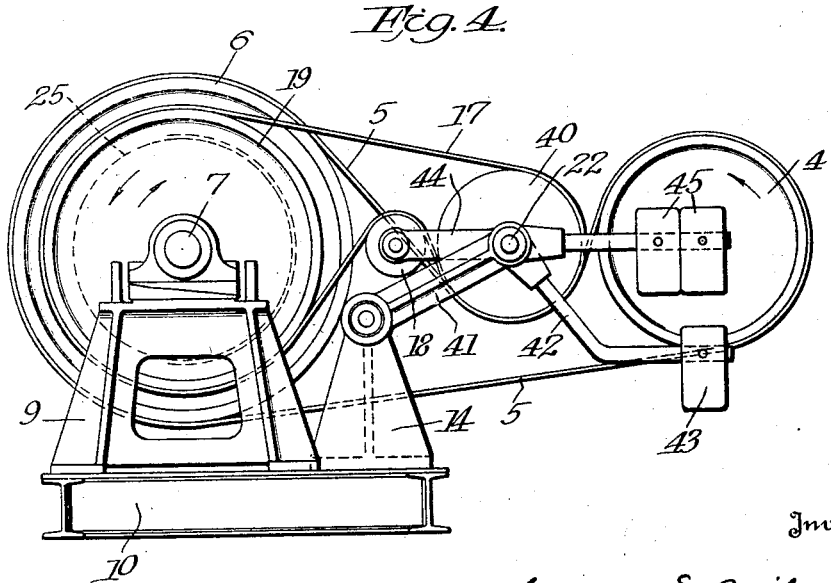
Fig. 4 is a modification, showing the contactor on the upper side of the slack reach of the belt.

In Fig. 4 I have shown a mechanism substantially the reverse of that shown in Figs. 1-3, where the main contactor pulley 40 having a wide face engages on top of the upper slack reach of belt 5. The arms 41 carrying the main contactor pulley 40 have extension 42 provided with adjustable weights 43.

On the shaft 22 of the main contactor pulley is pivoted a two armed lever 44, one arm carrying the auxiliary contactor pulley 18 for the reversing belt and the other arm the adjustable loading weights 45. In other respects the structure is the same as that shown in Figs. 1-3.

In this instance however, the dead weight of auxiliary contactor pulley 18, lever 44, and auxiliary contactor weights 45 are on the shaft 22 of the main contactor pulley and the adjustment of these weights affect the load of the main contactor pulley 40 to a greater extent than in the first construction described.

The adjustment of the loading weights 43 for the main contactor pulley 40, as before, does not affect the load on the reversing belt 5. It will be seen that in both constructions the two contactor pulleys can bodily move independently or simultaneously when taking up the slack in their respective belts.

I claim:

1. The combination with a driving belt and a bodily and automatically movable contactor pulley for the driving belt, of a second contactor pulley, loading means for the second contactor pulley and a second belt driven by the first contactor pulley and engaged by the second contactor pulley.

2. The combination with a driving belt and an automatically movable contactor pulley for said belt; of an auxiliary belt driven and engaged by the contactor pulley.

3. The combination with a driving belt and a bodily movable pivotally mounted contactor pulley for said belt; of an auxiliary belt driven and engaged by the contactor pulley.

4. The combination with a driving pulley, a driven pulley, a belt connecting the pulleys, a spindle, a contactor pulley mounted thereon to engage the belt between the driving and driven pulleys, said contactor pulley and its spindle being bodily movable; of a reversing belt driven by the contactor pulley, a double armed lever loose on the contactor pulley spindle, a second contactor pulley on one arm of the lever and engaging the second belt and loading means on the other arm of said lever, said second contactor pulley and its loading means loading the first contactor pulley.

5. The combination with a driving pulley, a driven pulley, a belt connecting the pulleys, a spindle, a contactor pulley mounted thereon to engage the belt between the driving and driven pulleys, said contactor pulley and its spindle being bodily movable; of a reversing belt driven by the contactor pulley, a double armed lever loose on the contactor pulley spindle, a second contactor pulley on one arm of the lever and engaging the second belt and loading means on the other arm of said lever, said second contactor pulley and its loading means loading the first contactor pulley, and means to load the first contactor pulley.

6. The combination with driving and driven pulleys, a main belt connecting them, a standard, an arm pivoted in the standard, a spindle mounted in the arm and a contactor pulley on the spindle; of a reversing belt on and driven by the contactor pulley, a lever pivoted on the spindle, a contactor pulley on the lever engaging the reversing belt and adjustable loading weight for the lever.

7. The combination with a driving pulley, of a counter shaft, two driven pulleys loose on the shaft, clutches to connect the driven pulleys to the shaft, a main driving belt between the driving pulley and one of the driven pulleys, a spindle and contactor pulley thereon for the main belt, a reversing belt between the contactor pulley and the other driven pulley and a contactor pulley for the reversing belt carried on the spindle.

8. The combination with a driving pulley, of a counter shaft, two driven pulleys loose on the shaft, clutches to connect and disconnect the driven pulleys and the shaft, a main driving belt between the driving pulley and one of the driven pulleys, a spindle and contactor pulley thereon for the main belt, a reversing belt between the contactor pulley and the other driven pulley and a contactor pulley for the reversing belt carried on the spindle, both of said contactor pulleys being bodily movable and the second contactor pulley also bodily movable independently of the first contactor pulley.

9. The combination with a driving pulley, of a counter shaft, two driven pulleys loose thereon, clutches to alternately connect the pulleys and shaft, a main forward driving belt between the driving pulley and one of the driven pulleys, a main spindle, standard rotatably supporting the main spindle, spaced arms rigid with the spindle, a main contactor spindle secured between the free ends of the said arms, a contactor pulley on the contactor spindle and arranged to engage the main belt between the driving pulley and its driven pulley, at least one of said arms having an extension a weight on said extension adjustable therealong, an open reverse driving belt between the contactor pulley and the other loose pulley, a two armed lever loosely pivoted on the contactor spindle, a contactor pulley on one arm of said lever arranged to engage the reversing belt and an adjustable weight on the other arm of said lever.

In testimony that I claim the foregoing as my invention, I have signed my name.

CHAS. E. BAILEY.